(12) United States Patent
Cho

(10) Patent No.: US 7,974,862 B2
(45) Date of Patent: Jul. 5, 2011

(54) INTELLIGENT BUILDING INCLUDING TIME-SHARE EXCLUSIVE ROOMS

(76) Inventor: Taig Youn Cho, Suwon (KR)

( * ) Notice: Subject to any disclaimer, the term of this patent is extended or adjusted under 35 U.S.C. 154(b) by 789 days.

(21) Appl. No.: 11/577,487

(22) PCT Filed: Nov. 24, 2005

(86) PCT No.: PCT/KR2005/003971
§ 371 (c)(1),
(2), (4) Date: Apr. 18, 2007

(87) PCT Pub. No.: WO2006/059850
PCT Pub. Date: Jun. 8, 2006

(65) Prior Publication Data
US 2009/0049756 A1    Feb. 26, 2009

(30) Foreign Application Priority Data

Dec. 2, 2004    (KR) .......................... 10-2004-0100136

(51) Int. Cl.
*G06Q 10/00*    (2006.01)
*E04H 14/00*    (2006.01)
*B66B 1/18*    (2006.01)

(52) U.S. Cl. ................................... 705/5; 52/1; 187/380
(58) Field of Classification Search ................... 187/380
See application file for complete search history.

(56) References Cited

U.S. PATENT DOCUMENTS

| | | | |
|---|---|---|---|
| 4,852,695 | A | 8/1989 | Ostrowiecki |
| 5,092,430 | A | 3/1992 | Goto et al. |

(Continued)

FOREIGN PATENT DOCUMENTS

EP    0 341 022    11/1989

(Continued)

OTHER PUBLICATIONS

Finley, M.R., Jr.; Karakura, A.; Nbogni, R.; Communications Magazine, IEEE Issue Date: Apr. 1991 vol. 29 Issue:4 on pp. 18-23.*

*Primary Examiner* — John W Hayes
*Assistant Examiner* — Tonya Joseph
(74) *Attorney, Agent, or Firm* — Rabin & Berdo, P.C.

(57) ABSTRACT

In order to provide an intelligent building having specific rooms in which relatively less wealthy persons may use, and meeting the demands for specific rooms and privacy for the general public at the same time, by optimizing the space efficiency. The intelligent building comprises: permanent exclusive rooms resided by a resident, which cannot be used except by permission of said resident; time-share exclusive rooms, which is usable by residents residing in a plurality of permanent exclusive rooms but cannot be used by others except by permission of said resident during a period of time used by said resident; at least one of a means for time-share exclusive passage, which connects one permanent exclusive room to one time-share exclusive room according to movement, wherein said means is usable by residents residing in a plurality of permanent exclusive rooms but cannot be used by others except by permission of said resident during a period of time used by said resident; and a server, which communicates with permanent exclusive rooms, time-share exclusive rooms, and means for time-share exclusive passage, and thereby capable of collecting information therefrom, and which controls permanent exclusive rooms, time-share exclusive rooms, and means for time-share exclusive passage according to predetermined rules.

13 Claims, 4 Drawing Sheets

U.S. PATENT DOCUMENTS

| | | | |
|---|---|---|---|
| 5,258,586 A * | 11/1993 | Suzuki et al. | 187/392 |
| 5,749,443 A | 5/1998 | Romao et al. | |
| 5,780,789 A * | 7/1998 | Tsuji | 187/382 |
| 5,952,626 A * | 9/1999 | Zaharia | 187/381 |
| 6,209,685 B1 * | 4/2001 | Zaharia et al. | 187/392 |
| 6,308,644 B1 * | 10/2001 | Diaz | 109/6 |
| 6,405,496 B1 * | 6/2002 | Stewart et al. | 52/185 |
| 6,611,195 B1 * | 8/2003 | Manneschi et al. | 52/185 |
| 7,191,873 B2 * | 3/2007 | Korchagin et al. | 340/5.52 |
| 7,419,032 B2 * | 9/2008 | Yamakawa | 187/239 |
| 2004/0178889 A1 | 9/2004 | Buckingham et al. | |
| 2004/0206018 A1 | 10/2004 | Stewart et al. | |
| 2005/0030176 A1 * | 2/2005 | Wagner | 340/539.13 |

FOREIGN PATENT DOCUMENTS

| | | |
|---|---|---|
| EP | 341022 A2 * | 11/1989 |
| JP | 11002033 A * | 1/1999 |
| JP | 2006031619 A * | 2/2006 |
| WO | 00/57004 | 9/2000 |
| WO | 02/31275 | 4/2002 |

* cited by examiner

[Fig. 1]

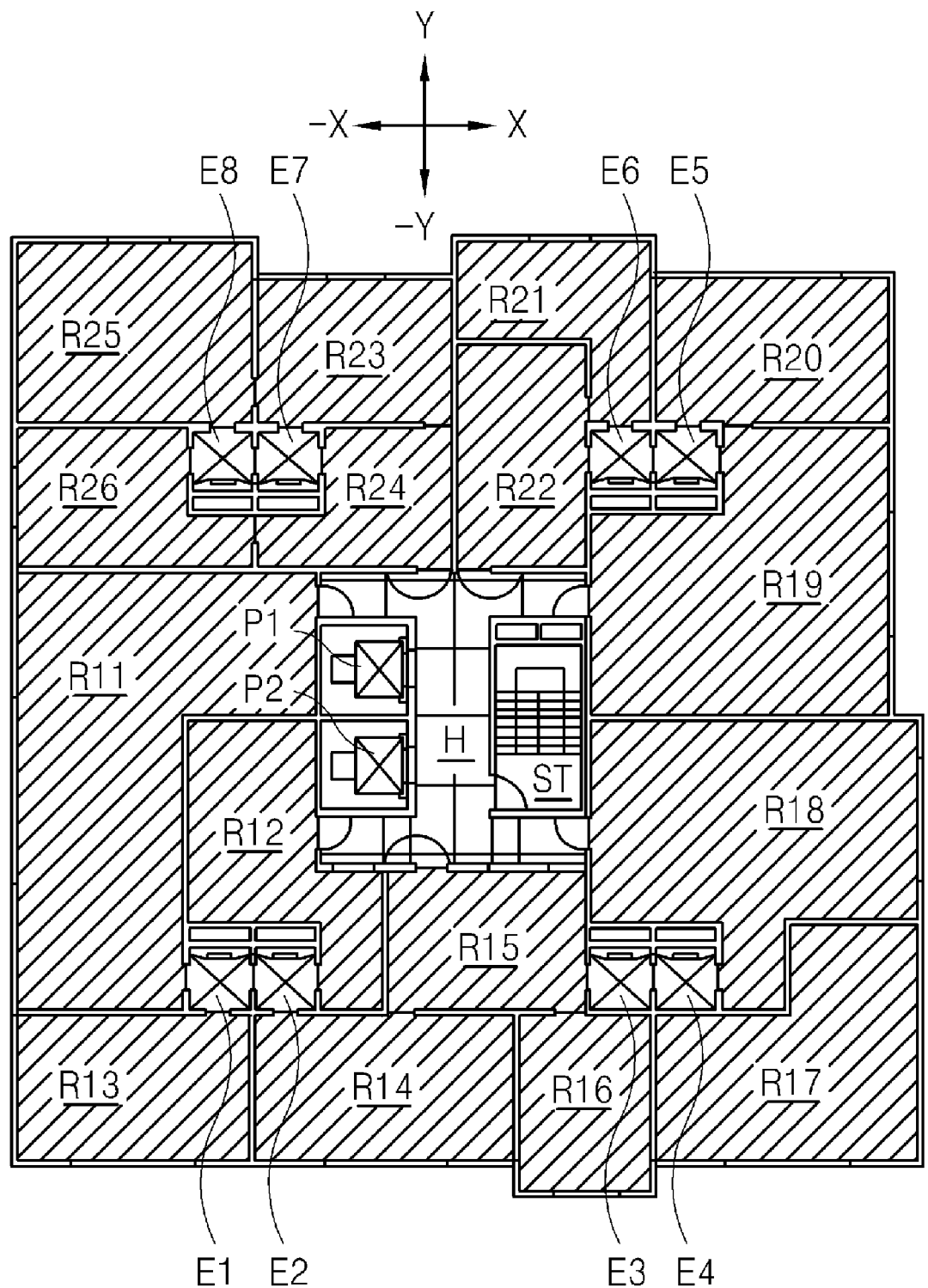
[Fig. 3]

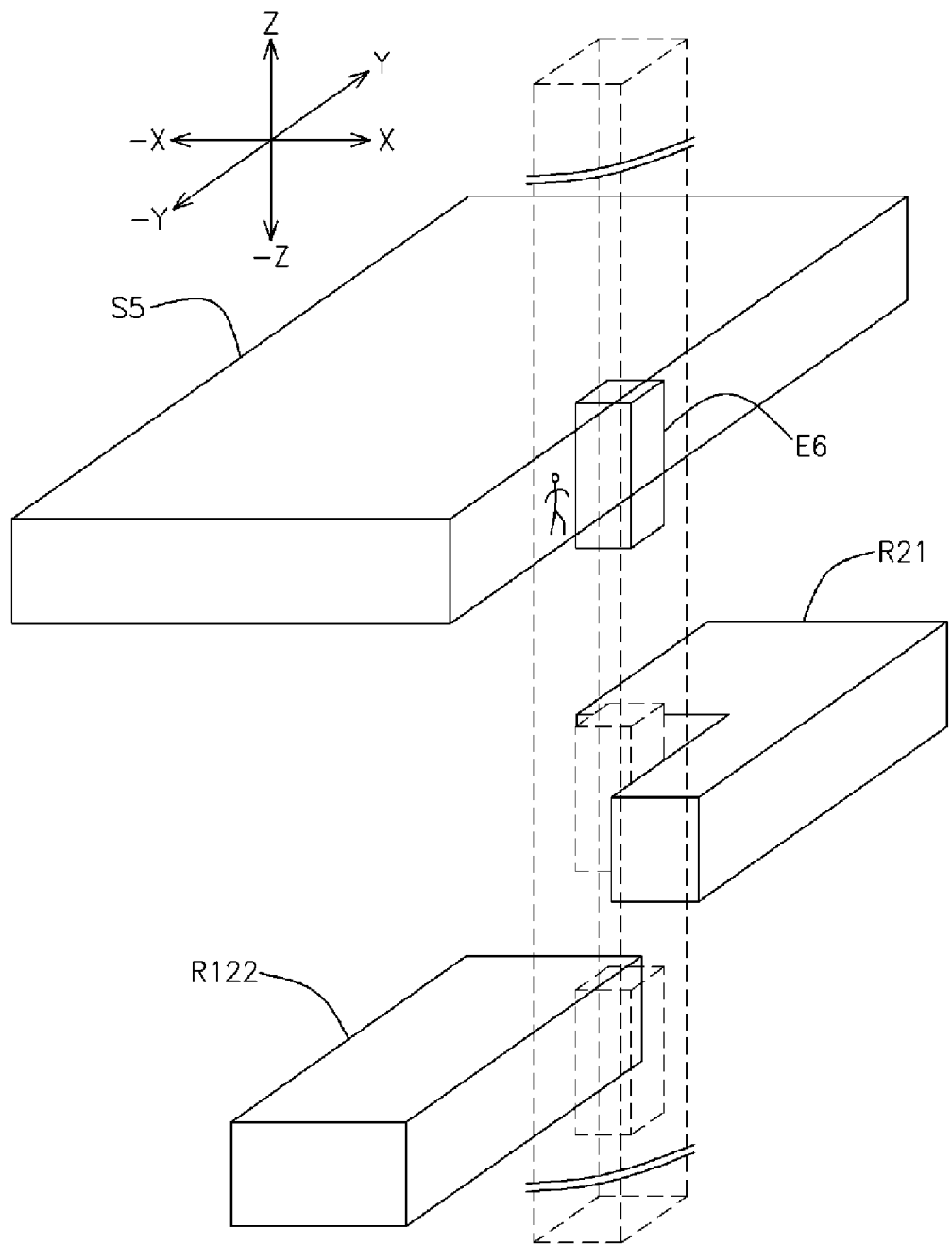
[Fig. 4]

INTELLIGENT BUILDING INCLUDING TIME-SHARE EXCLUSIVE ROOMS

TECHNICAL FIELD

The present invention relates to an intelligent building including time-share exclusive rooms.

BACKGROUND ART

A building refers any kind of architectural structure. Depending on how they are used, buildings can be classified into various kinds, such as residential buildings, office buildings, factory buildings, performing art buildings.

Such conventional buildings are designed such that rooms that residents are allowed to use are distinctly defined.

However, when rooms that each resident is allowed to use are defined in this way, there is a possibility there is a room in which residents may rarely use (for example, residents may not even use the room for an extended period like a day, week, month, etc.). Accordingly, the utilization rate of the room drops sharply, which may be inefficient in use in terms of the overall rooms.

Specifically, as the general public are increasing their standard of living, more people are demanding rooms for a specific use (for example, a home theater, a luxury bathroom, a working room, etc.), and moreover, people are reluctant to share rooms with others. For this reason, economically, only the wealthy have been able to possess such rooms.

DISCLOSURE

TECHNICAL SOLUTION

Therefore, the present invention has been made to solve the above-described problems, and an object of the invention is to provide an intelligent building having specific rooms in which relatively less wealthy persons may use, and meeting the demands for specific rooms and privacy for the general public at the same time.

Another object of the invention is to provide an intelligent building which resolves the need for moving by expanding necessary rooms of a current building and reducing unnecessary rooms, and allows others to use rooms that residents do not use, while satisfying individuals' privacies.

In order to achieve the above-described object, according to one aspect of the invention, an intelligent building comprises:

permanent exclusive rooms resided by a resident, which cannot be used except by permission of said resident;

time-share exclusive rooms, which is usable by residents residing in a plurality of permanent exclusive rooms but cannot be used by others except by permission of said resident during a period of time used by said resident;

at least one of a means for time-share exclusive passage, which connects one permanent exclusive room to one time-share exclusive room according to movement, wherein said means is usable by residents residing in a plurality of permanent exclusive rooms but cannot be used by others except by permission of said resident during a period of time used by said resident; and a server, which communicates with permanent exclusive rooms, time-share exclusive rooms, and means for time-share exclusive passage, and thereby capable of collecting information therefrom, and which controls permanent exclusive rooms, time-share exclusive rooms, and means for time-share exclusive passage according to predetermined rules.

In general, the invention can be applied to residential buildings such as apartments, efficiencies, residential and commercial complexes. However, the application is not limited to residential buildings; the invention can be equally applied to semi-residential buildings such as hotels, apartment type factories.

Preferably, each of the permanent exclusive rooms includes a first detection means which can detect whether the time-share exclusive rooms are available or not available, and a first calling means which can call the means for time-share exclusive passage. Preferably, the first detection means and the first calling means are connected to the server.

It is preferable that each of the time-share exclusive rooms includes a first availability detection means which detects the availability of the time-share exclusive room, a second detection means which can detect whether other time-share exclusive rooms are available or not available, and a second calling means which can call the means for time-share exclusive passage. Preferably, the first availability detection means, the second detection means and the second calling means are connected to the server.

It is preferable that each of the means for time-share exclusive passage includes second availability detection means which detects the availability of the means for time-share exclusive passage, a third detection means which can detect whether the time-share exclusive rooms are available or not available, and an instruction means which can instruct the means for time-share exclusive passage to move to a specific time-share exclusive room or a specific permanent exclusive room.

Preferably, the second availability detection means, the third detection means and the instruction means are connected to the server.

At least two of the means for time-share exclusive passage may be provided in the intelligent building, and at least two of the means for time-share exclusive passage are disposed adjacent to each other, and the server can control the two adjacently located means for time-share exclusive passage so that they can communicate with each other.

A variable door may be disposed between at least one permanent exclusive room and the time-share exclusive room which is located adjacent to the permanent exclusive room, and the server controls whether to use the variable door.

Hereinabove, exclusive rooms which ensure the individuals' privacies have been described; however, it is hard for some rooms to allow a specific resident to exclusively use them at a specific time point, because of the nature of the rooms. When considering rooms such as restaurants, sky lounges, and swimming pools in terms of the rooms' nature and construction expense, it is reasonable to allow many residents to access such rooms at one time. This allowance is preferred in terms of the application efficiency of the buildings (hereinafter, such rooms are referred to as 'concurrently occupied rooms').

However, even though it is necessary to allow many residents to use the concurrently occupied rooms at the same time, the residents need to move to the concurrently occupied rooms in privacy.

In order to achieve the above-described object, according to another aspect of the invention, an intelligent building comprises:

permanent exclusive rooms resided by a resident, which cannot be used except by permission of said resident;

concurrently occupied rooms in which a plurality of residents is allowed to concurrently use;

at least one of a means for time-share exclusive passage, which connects one permanent exclusive room to one concurrently occupied room according to movement, wherein said means is usable by residents residing in a plurality of permanent exclusive rooms but cannot be used by others except by permission of said resident during a period of time used by said resident; and a server, which communicates with permanent exclusive rooms, concurrently occupied rooms, and means for time-share exclusive passage, and thereby capable of collecting information therefrom, and which controls permanent exclusive rooms, concurrently occupied rooms, and means for time-share exclusive passage according to predetermined rules.

According to the above constitution, for example, when a resident moves to the swimming pool from his or her permanent exclusive room, he or she can move in a bathing suit due to the means for time-share exclusive passage. Even after finishing swimming, the resident can move to his or her permanent exclusive room in a bathing suit due to the means for time-share exclusive passage without changing clothes in a locker room or taking a shower in a shower room.

DESCRIPTION OF DRAWINGS

FIG. 3 is a plan view showing an example of a floor in which the time-share exclusive rooms are disposed, among a plurality of floors of an intelligent building, according to the invention.

FIG. 4 is a conceptual diagram showing a situation in which a resident who is resident in a specific permanent exclusive room moves to an arbitrary time-share exclusive room, among the various time-share exclusive rooms, by using the means for time-share exclusive passage.

BEST MODE

Figure 1:
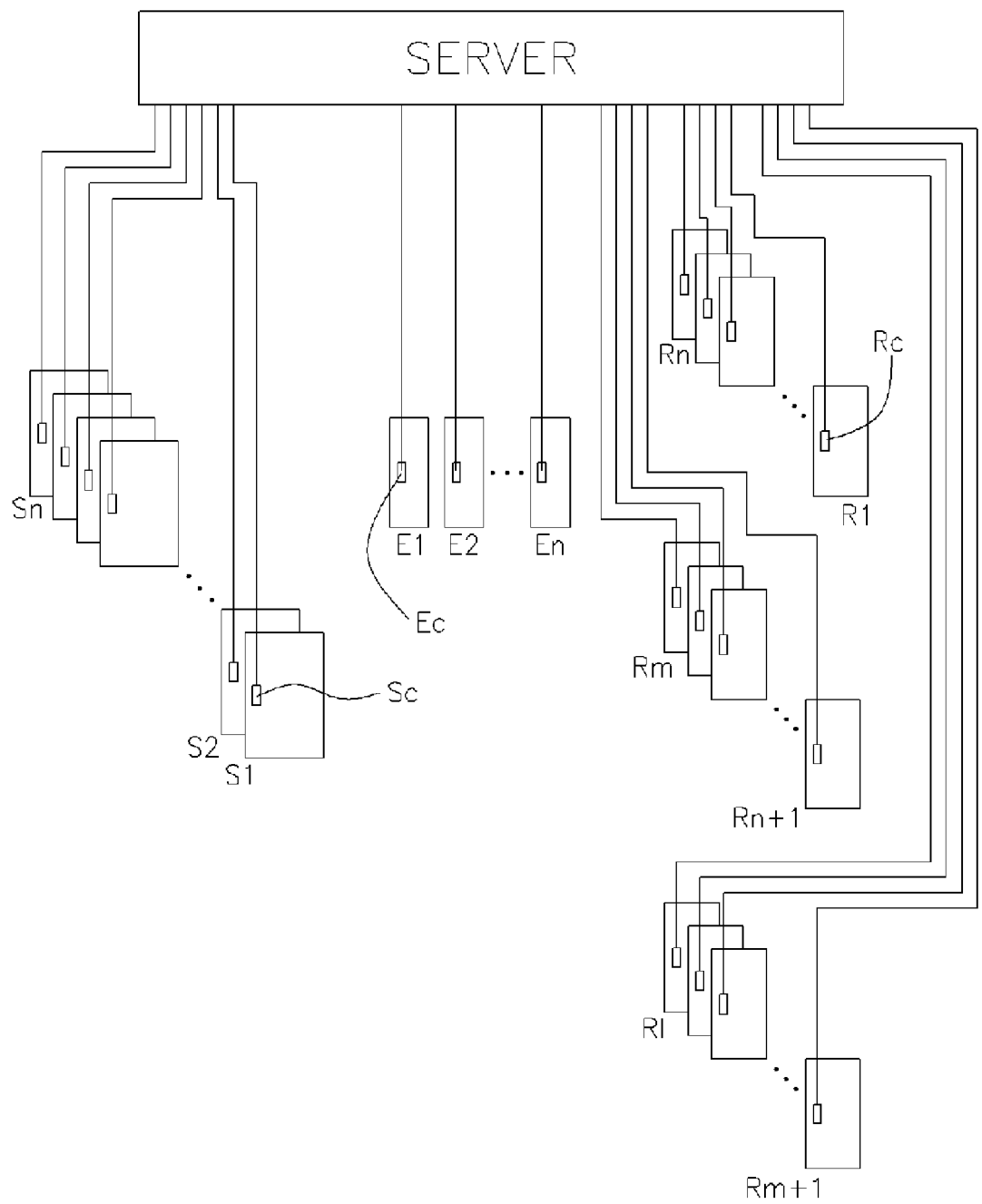
FIG. 1 is a schematic diagram showing the connection of permanent exclusive rooms, time-share exclusive rooms, means for time-share exclusive passage, and a server according to the invention.

Hereinafter, an intelligent building according to an embodiment of the present invention will be described in detail with reference to FIGS. 1 to 4.

The intelligent building of the invention has permanent exclusive rooms (S1, S2, ..., Sn), time-share exclusive rooms (R1, R2, ..., Rn, Rn+1, ..., Rm, Rm+1 ... R1), means for time-share exclusive passage (E1, E2, ..., En), and a server.

The permanent exclusive rooms (S1, S2, ..., Sn) are exclusively provided to specific residents (including a resident group such as families), and are not provided to others except by permission of the specific residents. The permanent exclusive room corresponds to a residential area that is exclusively used by one family in a conventional and typical apartment building.

The time-share exclusive rooms (R1, R2, ..., Rn, Rn+1, ..., Rm, Rm+1 ..., R1) are provided to residents who are resident in a plurality of permanent exclusive rooms. However, while the time-share exclusive room is occupied by a resident, others are not allowed to use the time-share exclusive rooms except by the resident's permission. In other words, the time-share exclusive room can be exclusively occupied by one resident in a temporary manner.

The time-share exclusive rooms can be used as specific rooms such as home theaters, luxury bathrooms, and working rooms. For example, a first group of time-share exclusive rooms (R1, R2, ..., Rn) can be equipped as home theaters, a second group of time-share exclusive rooms (Rn+1, ..., Rm) can be equipped as luxury bathrooms, and a third group of time-share exclusive rooms (Rm+1 ..., R1) can be equipped as working rooms.

The means for time-share exclusive passage (E1, E2, ..., En) can be used by residents who are resident in the plurality of permanent exclusive rooms. However, while the means for time-share exclusive passage is used by a resident, others are not allowed to use the means for time-share exclusive passage except by the resident's permission. An arbitrary room of the permanent exclusive rooms can be connected to an arbitrary room of the time-share exclusive rooms, corresponding to movements of the means for time-share exclusive passage. For example, an elevator can be used as the means for time-share exclusive passage, and more specifically, a multi-deck elevator can be used among elevators.

The server is connected to the permanent exclusive rooms, the time-share exclusive rooms, and the means for time-share exclusive passage to collect information therefrom, and functions to control them under predetermined rules.

To describe the permanent exclusive rooms (S1, S2, ..., Sn) in detail, each permanent exclusive room is provided with a first detection means which can detect whether the time-share exclusive rooms (R1, R2, ..., Rn, Rn+1, ..., Rm, Rm+1 ..., R1) are available or not available, and a first calling means which can call the means for time-share exclusive passage (E1, E2, ..., E8). The first detection means and the first calling means communicate with the server.

The server receives information about availability of the time-share exclusive rooms from first availability detection means which detects the availability of the time-share exclusive rooms (R1, R2, ..., Rn, Rn+1, ..., Rm, Rm+1 ..., R1), so as to transmit the information about the time-share exclusive rooms which are available to a specific resident to the specific resident by using the first detection means, corresponding to the resident's demands or constantly. Thus, the resident detects the information transmitted by the first detection means so as to decide which time-share exclusive room to use. When the resident has decided which time-share exclusive room to use, the resident can call the means for time-share exclusive passage by using the first calling means.

The first detection means and the first calling means can be embodied by using known electronic equipments. They can be integrated to a first interface panel Sc which is disposed at a region where the permanent exclusive rooms meet the means for time-share exclusive passage (for example, where a button for calling an elevator, an example of the means for time-share exclusive passage, is located). Their functions can be performed by home electronic equipments (for example, a television receiver), which are connected to the first detection means and the first calling means by home networks, or a mobile network device.

Figure 2:
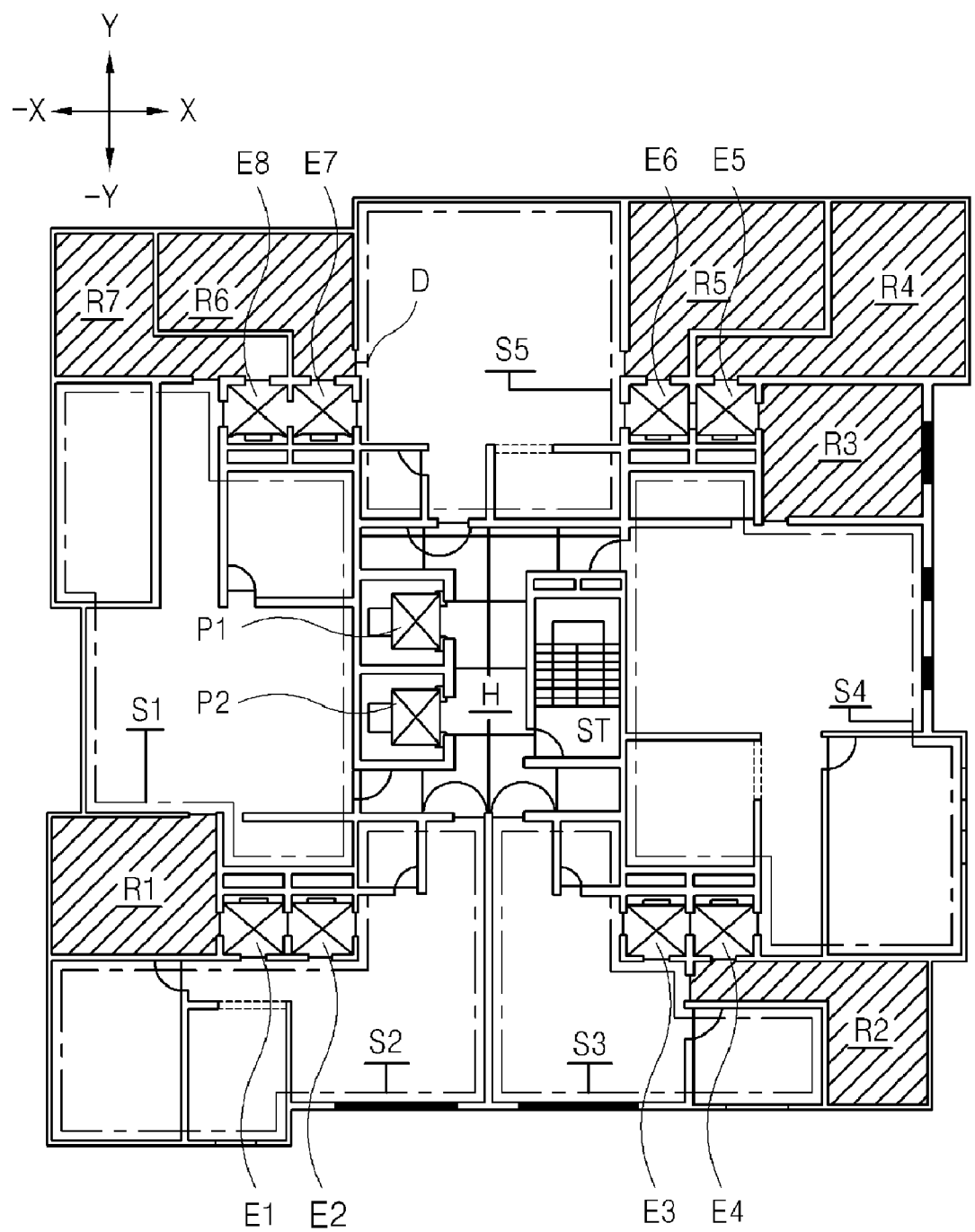
FIG. 2 is a plan view showing an example of a floor in which the permanent exclusive rooms are disposed, among a plurality of floors of the intelligent building, according to the invention.

As shown in FIG. 2, the respective permanent exclusive rooms (S1, S2, ..., S5) can be connected to the adjacent means for time-share exclusive passage (E1, E2, ..., E8). However, the server controls a door of the means for time-share exclusive passage (for example, a door facing toward an X direction of a means for time-share exclusive passage E7 and a door facing toward a X direction of a means for time-share exclusive passage E6, in case of a permanent exclusive room S5) which is adjacent to the respective permanent exclusive rooms not to open except by permission of residents who are resident in the respective permanent exclusive rooms.

To describe the time-share exclusive rooms (R1, R2, ..., Rn, Rn+1, ..., Rm, Rm+1 ..., Rl) in detail, each of the time-share exclusive rooms is provided with a second detection means which can detect whether another time-share exclusive rooms are available or not available, and a second calling means which can call the means for time-share exclusive passage (E1, E2, ..., E8). The second detection means and the second calling means are connected to the server.

The server receives information about the availability of the time-share exclusive rooms from the first availability detection means which detects the availability of the time-share exclusive rooms (R1, R2, ..., Rn, Rn+1, ..., Rm+1 ..., Rl), so as to transmit the information about the time-share exclusive rooms which are available to the specific resident who is using a specific time-share exclusive room, corresponding to the resident's demands or constantly. Thus, the resident detects the information transmitted by the second detection means so as to decide which other time-share exclusive room to use. When the resident has decided which time-share exclusive room to use, the resident can call the means for time-share exclusive passage by using the second calling means.

The second detection means and the second calling means can be embodied by using known electronic equipments. They can be integrated to a second interface panel Rc which is disposed at a region where the time-share exclusive rooms meet the means for time-share exclusive passage (for example, where a button for calling an elevator, an example of the means for time-share exclusive passage, is located). They can be constructed by a mobile network device.

The respective time-share exclusive rooms (R1, R2, ..., Rl) can be connected to the adjacent means for time-share exclusive passage (E1, E2, ..., E8). However, the server controls a door of the means for time-share exclusive passage (for example, a door facing toward a Y direction of a means for time-share exclusive passage E6, in case of a time-share exclusive room R21 of FIG. 3) not to open except by permission of a resident who is using the time-share exclusive room.

To describe the means for time-share exclusive passage (E1, E2, ..., En) in detail, each of the time-share exclusive rooms is provided with a second availability detection means which detects the availability of the means for time-share exclusive passage, a third detection means which can detect whether the time-share exclusive rooms are available or not available, and an instruction means which instruct the means for time-share exclusive passage to move to a specific time-share exclusive room or a specific permanent exclusive room. The second availability detection means, the third detection means, and the instruction means are connected to the server.

The server receives information about the availability of the time-share exclusive rooms from the first availability detection means which detects the availability of the time-share exclusive rooms (R1, R2, ..., Rn, Rn+1, ..., Rm+1 ..., Rl), so as to transmit the information about the time-share exclusive rooms which are available to a resident to the resident who is using a specific time-share exclusive room by using the third detection means, corresponding to the resident's demands or constantly. Thus, the resident detects the information transmitted by the third detection means so as to decide which time-share exclusive room to use. When the resident has decided which time-share exclusive room to use, the resident can instruct the means for time-share exclusive passage which is being occupied by the resident to move.

The third detection means and the instruction means can be embodied by using known electronic equipments. They can be integrated to a third interface panel Ec which is disposed at a region where buttons for instructing an elevator are disposed, or can be constructed by a mobile network device.

Sensors such as various physical and electromagnetic means which can detect opening and closing of a door, a sensor which can detect bionics information of residents, and a sensor which can detect RFID that residents possess can be adopted for the first availability detection means and the second availability detection means.

In the meantime, the processing of collecting information from the permanent exclusive rooms, time-share exclusive rooms, and means for time-share exclusive passage can be implemented under a ubiquitous environment which allows the server to analyze the situation and make command.

The server perceives situations that a resident is facing, figures out purposes of using a specific time-share exclusive room, analyzes a current state of the rooms, selects the most appropriate time-share exclusive room for the resident, and operates the means for time-share exclusive passage.

Intelligent buildings can be designed in various types, and even floors on which the permanent exclusive rooms are disposed inside an intelligent building can be designed in a different manner. Each floor of the intelligent building may be classified into the floor on which the permanent exclusive rooms (S1, S2, S3, S4, S5) and the time-share exclusive rooms (R1, R2, ..., R7) are disposed as shown in FIG. 2, the floor on which only the time-share exclusive rooms (R11, R12, ..., R26) are disposed as shown in FIG. 3, and the floor on which only the permanent exclusive rooms are disposed. Further, each kind may have two or more floors if needed.

On the floor shown in FIG. 2, the permanent exclusive rooms (S1, S2, S3, S4, S5), the time-share exclusive rooms (R1, R2, ..., R7), and the means for time-share exclusive passage (E1, E2, ..., E8) are disposed. The means for time-share exclusive passage are movable in a forward direction of the drawing (in a Z direction of FIG. 4) or in a rearward direction (in a Z direction of FIG. 4). The floor shown in FIG. 2 is taken at a time point where all the means for time-share exclusive passage are disposed on the same floor, and this is same for FIG. 3.

Furthermore, in FIG. 2, public moving means P1 and P2, public stairs ST, and hall-ways H which connect the public moving means, the public stairs and the permanent exclusive rooms. These are already built in a conventional building, and are mandatory under construction regulations. However, the embodiment of the invention does not necessarily require these. For example, an elevator can be adopted as a public moving means.

Hereinafter, how to use the intelligent building will be described with reference to FIGS. 2 to 4. Each resident would hope to use a specific time-share exclusive room, or one of the specific kinds of time-share exclusive rooms. In the following description, the former case in which each resident would hope to use a specific time-share exclusive room will be mainly described. In the latter case in which a specific resident hopes to use one of the time-share exclusive rooms of a specific kind, the server can designate an available time-share exclusive room.

The permanent exclusive room S5 shown in FIG. 4 is also shown in FIG. 2, and the time-share exclusive room R21 shown in FIG. 4 is also shown in FIG. 3. A time-share exclusive room R122 shown in FIG. 4 is located on a floor other than the floor on which the permanent exclusive room S5 is disposed, and the floor on which the time-share exclusive room R21 is disposed. The time-share exclusive room R122 is disposed in a location corresponding to a vertical direction (in the Z or Z direction) of a time-share exclusive room R22 shown in FIG. 3. The time-share exclusive room R21 can be equipped as, for example, a home theater, and the time-share exclusive room R122 can be equipped as a luxury bathroom.

When the specific means for time-share exclusive passage E6 is called by a resident who is resident in the permanent exclusive room S5, the server detects information transmitted from the second availability detection means which is provided in the means for time-share exclusive passage E6, and sends the means for time-share exclusive passage E6 to the resident who called the means, as shown in FIG. 4, if no one is using the means for time-share exclusive passage E6. If the means for time-share exclusive passage E6 is being used by others when the resident calls the means for time-share exclusive passage E6, the server sends the means for time-share exclusive passage E6 to the resident in the permanent exclusive room S5 after others stop using the means for time-share exclusive passage E6.

After the resident who is resident in the permanent exclusive room S5 gets into the means for time-share exclusive passage E6 through a door facing toward the X direction of the means for time-share exclusive passage E6, the resident can command the means for time-share exclusive passage E6 to move to the available time-share exclusive room R21 by operating the third interface panel Ec disposed inside the means for time-share exclusive passage E6.

Four directions of the means for time-share exclusive passage E6 are provided with doors. Accordingly, when the resident moves to the time-share exclusive room R21, the door facing toward the Y direction is open, and when the resident moves to the time-share exclusive room R122, the door facing toward the X direction is open.

As a resident who is resident in the permanent exclusive room S5 moves from the permanent exclusive room S5 to the time-share exclusive room R21, the permanent exclusive room S5 is substantially connected to the time-share exclusive room R21. Such a connection can be made between an arbitrary permanent exclusive room which can be connected to a specific means for time-share exclusive passage and an arbitrary time-share exclusive room.

While a resident who is resident in the permanent exclusive room S5 is using the time-share exclusive room R21, the server detects that the time-share exclusive room R21 is being used by using the first availability detection means, and thus, the time-share exclusive room R21 is kept from other person except by permission of the resident who is resident in the permanent exclusive room S5.

At this time, other person may request a permission of the resident who is using the time-share exclusive room R21 to share the time-share exclusive room R21, and the resident who is using the time-share exclusive room R21 may approve or disapprove of the request. When the resident who is using the time-share exclusive room R21 wants to disapprove of the request, the resident who is using the time-share exclusive room R21 is not notified of the request of other person by the server. A system which can realize request, approval and disapproval can be embodied by known electronic equipments, and parts of the electronic equipments can be disposed in the first interface panel Sc, the second interface panel Rc, and the third interface panel Ec.

The resident using the time-share exclusive room R21 can monitor his or her permanent exclusive room S5 (for example, whether someone visits his or her permanent exclusive room S5 via the hall-way H) by using the second interface panel Rc, and can communicate with residents who live together in the permanent exclusive room S5. The resident using the time-share exclusive room R21 can stop using the time-share exclusive room R21 and move to his or her permanent exclusive room S5 or other available time-share exclusive rooms. When the resident decides to move to a specific room, the resident calls the means for time-share exclusive passage E6 by using the second calling means, gets into the means for time-share exclusive passage E6, and instructs the means for time-share exclusive passage E6 to move by operating the third interface panel Ec disposed inside the means for time-share exclusive passage E6.

Hereinabove, moving between a specific permanent exclusive room and a specific time-share exclusive room has been mainly described. However, residents can move between the permanent exclusive rooms (S1, S2, . . . , Sn) if only the residents are approved by a resident who is resident in the permanent exclusive room that the residents want to visit. This process is performed similar to the above-described process of request, approval and disapproval about the sharing of the time-share exclusive room R21.

As shown in FIG. 2, when the permanent exclusive rooms (S1, S2, . . . , S5) and the time-share exclusive rooms (R1, R2, . . . , R7) are disposed on the same floor, for example, the permanent exclusive room S5 can be connected to the time-share exclusive rooms R5 and R6 which are adjacent to the permanent exclusive room S5 through a variable door D disposed therebetween.

Whether the variable door D is available or not available is controlled by the server. Since the variable door D is permanently locked, so that the rooms (R1, R2, . . . , R7) are used as the time-share exclusive rooms. However for example, when a resident of the permanent exclusive room S5 wants to permanently use the time-share exclusive room R6 as his or her exclusive room, the resident should apply for approval of a management center so as to include the room R6 which has been initially used and the time-share exclusive room in his or her permanent exclusive room S5. In this way, if the room R6 is included in the permanent exclusive room S5, the state of the variable door D is changed to be available by the server, making it possible for the resident to open or close the variable door, and access to the room R6 by others via the means for time-share exclusive passage E7 is prohibited. In this case, since the ownership of the time-share exclusive room included in the permanent exclusive room belongs to the resident who is resident in the permanent exclusive room, the time-share exclusive room can be permanently modified (for example, interior renovation).

In addition, when the resident who is resident in the permanent exclusive room S5 wants to use the time-share exclusive room R6 while the variable door D is not available, the resident gets into the means for time-share exclusive passage E7 through a door of X direction of the means for time-share exclusive passage E7, and gets off the means for time-share exclusive passage E7 through the door facing toward the Y direction so as to enter the time-share exclusive room R6.

Moreover, at least two means for time-share exclusive passage can be adjacently disposed to each other in the intelligent building according to the invention. When the means for time-share exclusive passage E5 and E6 are taken as an example, the means for time-share exclusive passage E5 can be connected to the means for time-share exclusive passage E6, corresponding to the control of the server.

The fact that the means for time-share exclusive passage E5 and the means for time-share exclusive passage E6 are connected to each other means that a resident who is resident in the means for time-share exclusive passage E5 can moves to the means for time-share exclusive passage E6, and vice versa, as both of the door facing the X direction of the means for time-share exclusive passage E5 and the door facing the X direction of the means for time-share exclusive passage E6 are open while both of the means for time-share exclusive passage E5 and E6 are on the same floor.

In this way, since the means for time-share exclusive passage E5 and the means for time-share exclusive passage E6 are connected to each other, a resident who is resident in the permanent exclusive room S5 may not only use the time-share exclusive room R3 on the same floor which is not located adjacent to the permanent exclusive room S5, but also use a time-share exclusive room R19 on another floor.

In the meantime, in the above-described embodiment, when the time-share exclusive rooms are substituted by concurrently occupied rooms, many residents can access such rooms at one time. However, since the residents are moving still by the means for time-share exclusive passage, the residents can keep their privacy without concerning about their clothing or the situation.

In the above-described embodiment, if a ropeless means for time-share exclusive passage which is movable in a vertical direction can be used, a plan view of the building becomes more flexible, and accessibility to the rooms further increases, thus further improving space efficiency.

In addition, a room which is initially designed for a permanent exclusive room can be modified into a time-share exclusive room. On the other hand, a room which is initially designed for a time-share exclusive room can be modified into a permanent exclusive room if needed. The modifications are enabled by the management center controlling the server. By the modifications, the number of the permanent exclusive rooms and the time-share exclusive rooms can be optimized.

By optimizing the space efficiency, the invention can provide the intelligent building having specific rooms that relatively less wealthy persons may use, and meet the demands for specific rooms and privacy for the general public at the same time.

Further, the intelligent building can resolve the need for moving by expanding necessary rooms of a current building and reducing unnecessary rooms, and allow others to use rooms that residents do not use, while satisfying individuals' privacies. Furthermore, rooms that are unnecessary to resident can be used by others, thus obtaining an additional rent.

The invention claimed is:

1. An intelligent building comprising:
   a plurality of permanent exclusive rooms resided by permanent residents, each permanent exclusive room being resided by each corresponding permanent resident and being prevented from being used by others except by permission of said each corresponding permanent resident;
   a plurality of time-share exclusive rooms, wherein each time-share exclusive room is usable by any of said permanent residents, but once a time-share exclusive room is occupied by one of said permanent residents during a period of time, said one permanent resident is allowed to choose to be notified of a request from other residents for permission to share said time-share exclusive room or to choose to be prevented from being notified of such a request, the time-share exclusive room cannot be used by others during said period of time when said one permanent resident has chosen to be prevented from being notified of the request or when the request is disapproved by said one permanent resident after being notified of said request;
   time-share exclusive passage, which connects between at least one permanent exclusive room including a first permanent exclusive room and at least one time-share exclusive room including a first time-share exclusive room, wherein said time-share exclusive passage is usable by any of said permanent residents, but once said time-share exclusive passage is occupied by a user who is one of said permanent residents, said time-share exclusive passage cannot be used by others during a period of time used by said user except by permission of said user, and said time-share exclusive passage has a first door that faces the first permanent exclusive room when said time-share exclusive passage is connected to the first permanent exclusive room, allowing a first permanent resident residing in the first permanent exclusive room to enter said time-share exclusive passage from the first permanent exclusive room through the first door; and
   a server, which communicates with said permanent exclusive rooms, said time-share exclusive rooms, and said time-share exclusive passage, and collects information about the availability of time-share exclusive rooms and time-share exclusive passage therefrom, and transmits the collected information to the residents who are using permanent exclusive rooms, time-share exclusive rooms, or time-share exclusive passage, and controls operation of time-share exclusive passage to transport the residents to places corresponding to the residents' demands and controls entrance of the residents to the demanded places when said places are used by others,
   wherein at least two of the time-share exclusive passage are provided in the intelligent building, and at least two of the time-share exclusive passage are disposed adjacent to each other, and the server controls the two adjacently located time-share exclusive passage to be connected to each other.

2. The intelligent building of claim 1, wherein each of the permanent exclusive rooms includes: a first detection means which detects whether the time-share exclusive rooms are available; and a first calling means which calls the time-share exclusive passage, wherein the first detection means and the first calling means are connected to the server.

3. The intelligent building of claim 2, wherein each of the time-share exclusive rooms includes: first availability detection means which detects the availability of each time-share exclusive room; second detection means which detects whether other time-share exclusive rooms are available; and a second calling means which calls the time-share exclusive passage, wherein the first availability detection means, the second detection means and the second calling means are connected to the server.

4. The intelligent building of claim 3, wherein each of the time-share exclusive passage includes: a second availability detection means which detects the availability of each time-share exclusive passage; a third detection means which detects whether the time-share exclusive rooms are available; and an instruction means which instructs the time-share exclusive passage to move to a specific time-share exclusive room or a specific permanent exclusive room, wherein the second availability detection means, the third detection means and the instruction means are connected to the server.

5. The intelligent building of claim 4, wherein a variable door is disposed between a permanent exclusive room and a time-share exclusive room which is located adjacent to the permanent exclusive room, and the server controls the variable door.

6. The intelligent building of claim 3, wherein a time-share exclusive room is changeable to be used as a permanent exclusive room at the request of the residents and a permanent exclusive room is changeable to be used as a permanent exclusive room at the request of the residents.

7. The intelligent building of claim 3, wherein a variable door is disposed between a permanent exclusive room and a time-share exclusive room which is located adjacent to the permanent exclusive room, and the server controls the variable door.

8. The intelligent building of claim 2, wherein a variable door is disposed between a permanent exclusive room and a time-share exclusive room which is located adjacent to the permanent exclusive room, and the server controls the variable door.

9. The intelligent building of claim 1, wherein a variable door is disposed between a permanent exclusive room and a time-share exclusive room which is located adjacent to the permanent exclusive room, and the server controls the variable door.

10. The intelligent building of claim 2, wherein a time-share exclusive room is changeable to be used as a permanent exclusive room at the request of the residents and a permanent exclusive room is changeable to be used as a permanent exclusive room at the request of the residents.

11. The intelligent building of claim 1, wherein a time-share exclusive room is changeable to be used as a permanent exclusive room at the request of the residents and a permanent exclusive room is changeable to be used as a permanent exclusive room at the request of the residents.

12. The intelligent building of claim 1, wherein the time-share exclusive room is a home theater, a bathroom or a working room.

13. The intelligent building of claim 1, wherein the intelligent building has a plurality of floors, and at least one of the permanent exclusive rooms and at least one of the time-share exclusive rooms are located on the same floor of the intelligent building.

* * * * *